United States Patent [19]
Hamilton et al.

[11] 3,972,850
[45] Aug. 3, 1976

[54] HYDROPHOBIC WINDSHIELD WIPERS AND PROCESS FOR MAKING SAME

[75] Inventors: Wilson S. Hamilton, Bellevue; Malcolm T. Katsumato, Mercer Island; James M. Lea, Seattle; George E. Trepus, Enumclaw, all of Wash.

[73] Assignee: The Boeing Company, Seattle, Wash.

[22] Filed: Nov. 13, 1974

[21] Appl. No.: 523,382

Related U.S. Application Data

[63] Continuation-in-part of Ser. No. 287,452, Sept. 8, 1972, abandoned.

[52] U.S. Cl. .............................. 260/37 SB; 15/245; 15/250.36
[51] Int. Cl.² ........................................ C08L 83/04
[58] Field of Search ............. 260/37 SB; 15/250.36, 15/245

[56] References Cited
UNITED STATES PATENTS

| | | | |
|---|---|---|---|
| 2,908,028 | 10/1959 | Runton et al. ................ | 15/250.36 X |
| 2,979,479 | 4/1961 | Modic ............................ | 260/37 SB |
| 2,983,694 | 5/1961 | Page et al. .................... | 260/37 SB X |
| 3,522,620 | 8/1970 | Nozawa et al. ................ | 15/250.36 |

*Primary Examiner*—Lewis T. Jacobs
*Attorney, Agent, or Firm*—Morris A. Case; Bernard A. Donahue

[57] ABSTRACT

A windshield wiper imparting hydrophobic properties to a surface over which it moves is prepared from a polymerized silicone elastomer having about 3 to 20 parts per hundred of a dispersed filler selected from silica, mica, molybdenum disulfide, and tetra fluoro ethylene, and about 0.2 to 10 parts per hundred of an additive of dicoco dimethyl ammoniumchloride or an acetate salt of a copolymer with the formula

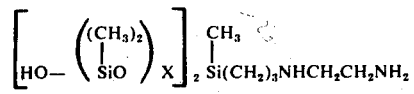

and X has a total value of from 10 to 400 inclusive.

Also disclosed is a method of imparting repellency to a windshield by immersing a wiper in an alcohol solution containing about 50 weight percent of the acetate salt of the copolymer named above.

7 Claims, No Drawings

HYDROPHOBIC WINDSHIELD WIPERS AND PROCESS FOR MAKING SAME

BACKGROUND OF THE INVENTION

This continuation-in-part application claims priority to the common subject matter in the parent application, Ser. No. 287,452, filed Sept. 8, 1972 and now abandoned.

The windshield wiper blade has long been used as a means of aiding visibility during the impingement of rain on a windshield. The wiper acts to remove excess water and leaves a uniform film of water a few thousands of an inch thick through which visibility is quite good. In a heavy downpour the wiper cannot remove water fast enough and the resulting thick nonuniform layer of water gives poor visibility. The wiper blades have been modified in many ways to enhance visibility during a rainstorm. The configuration of the blade has been changed to give a plurality of contact surfaces on the blade. Porous materials, containing a wetting agent which is gradually leached out by the rainfall, is incorporated into the wiper blade. The wetting agent wets the windshield to give uniformity of viewing in a light rain, but does not materially aid visibility in a heavy downpour. It was discovered that a windshield wiper blade may be used to impart hydrophobic properties to windshields being wiped to give visibility even in a heavy downpour. The wiped wind-shield repels water causing it to form in droplets which are removed from the surface by the wipers and or by air movement. One sees between the drops.

SUMMARY OF THE INVENTION

A windshield wiper blade of a silicone elastomer with a filler and an additive imparts hydrophobic characteristics to a windshield.

The elastomer may be composed of a polymer such as a polydimethylsiloxane, polyphenylmethylsiloxane, polyvinylmethylsiloxane, or polytrifluoropropylmethylsiloxane, however, the siloxane elastomer is preferably a copolymer. It is preferred to use a copolymer of a dimethylsiloxane containing limited amounts of a phenyl, vinyl or trifluoropropyl functional group. These organic radicals are used in the form of phenylmethylsiloxane, vinylmethylsiloxane or trifluoropropylmethylsiloxane to combine with dimethylsiloxane in a peroxide to form an elastomeric copolymer. These siloxane copolymers are normally prepared by copolymerizing mixtures of the desired cyclics such as [(CH$_3$)$_2$ SiO]$_4$, (C$_6$H$_5$CH$_3$SiO)$_4$, [CH$_3$(CH$_2$CH)SiO]$_4$ and (F$_3$C$_2$H$_2$CH$_3$SiO)$_4$. The filler may be silica, mica, molybdenum disulfide or tetra fluoro ethylene, and the additive may be dicoco dimethyl ammonium chloride or an acetic acid neutralized copolymer of the formula

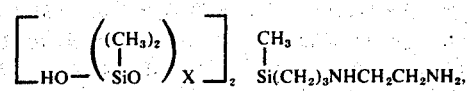

and X has a total value of from about 10 to 400 inclusive with a value of from about 14 to 27 preferred.

A preferred composition of the wiper uses a copolymer of about 100 parts dimethylsiloxane and about 0.142 parts per hundred of a siloxane containing a functional group. This copolymer has combined therein about 3 to 20 parts per hundred of a filler and about 0.2 to 10 parts per hundred of the additive. Thus, all parts are based on 100 parts of the dimethylsiloxane polymer, however, in other preferred embodiments the parts of filler and or additives may be based on 100 parts of the elastomeric copolymer.

The wiper blade may be prepared from a heat curing silicone elastomer by mixing the silicone copolymer gum, filler, additive and about 1 to 2 parts of a peroxide catalyst such as benzoyl peroxide, ditertiary butyl peroxide, tertiary butyl perbenzoate and 2 - 4 dichlorobenzoyl peroxide in a roll mill. The mixture is then contained in a mold in which air is excluded, and heated at from about 240° to 260°F for about 10 minutes then post cured at about 350°F for about 3 hours.

Room temperature vulcanizing silicone elastomers may also be used to give windshield wipers with hydrophobic imparting characteristics. Room temperature vulcanizing fluids with silanol end groups may be prepared by depolymerizing linear dimethylpolysiloxane with water containing a catalyst such as potassium hydroxide, ammonia or an amine and heating at 300° to 345°F to obtain a viscous liquid. A filler, additive and peroxide catalyst is mixed into the viscous liquid, poured into a mold and cured therein for about 24 hours at ambient temperatures. The room temperature vulcanizing silicone fluid may also be prepared as above from copolymers of a dimethylsiloxane polymer and polymers containing a functional group such as phenylmethylsiloxane or trifluoropropylsiloxane. These room temperature vulcanizing silicone elastomers are shown by way of example only and are not intended to be limiting.

It was discovered that hydrophobic imparting characteristics may be induced in conventional organic elastomer type windshield wipers by soaking or otherwise impregnating the wiper with an alcohol solution of an acid neutralized cationic copolymer of the formula

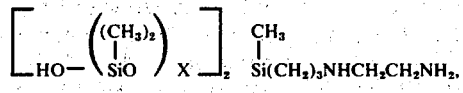

and X has a total value of from about 10 to 400 inclusive with a value of about 14 to 27 preferred.

The wiper is immersed for from about 1 to 7 days in a solution containing about 48 weight percent copolymer, about 3 weight percent acetic acid and the remainder an alcohol of isopropanol or tertiary butanol.

An object of this invention is to provide a windshield wiper that imparts hydrophobic characteristics to a windshield.

Another object is to provide a method of preparing a windshield wiper having hydrophobic imparting characteristics.

Yet another object of this invention is to treat existing windshield wiper blades to impart hydrophobic properties to windshields using the treated blades.

DESCRIPTION OF PREFERRED EMBODIMENT

Windshield wipers were prepared from silicone elastomers, from silicone elastomers with various fillers and from silicone elastomers with fillers and additives, and the wipers placed on the windshields of automobiles for evaluation. The coefficient of friction of the silicone elastomer alone was so high the blades with elastomer only could not be used.

EXAMPLE 1

A silicone elastomer copolymer gum of 100 moles of dimethylsiloxane and 0.142 moles of vinylmethylsiloxane was mixed with 10 parts per hundred (p.p.h.) of silica, 10 p.p.h. of fluorosilicone oil and 1.5 p.p.h. of 2 - 4 dichlorobenzoyl peroxide in a shearing mixer such as a roll mill or Banbury mixer, placed in a mold and heated at about 240° to 260°F for about 10 minutes, and post cured for 3 hours at 350°F. This wiper had a low coefficient of friction, operated quietly and was tested on the windshield of an automobile for a period in excess of a year. This imparted hydrophobic characteristics to the windshield. Visibility was maintained with this wiper even during heavy rainfalls as water formed in drops instead of wetting the surface and the drops rolled away due to wind velocity and or the action of the wiper.

EXAMPLE 2

A wiper was prepared with the same compounds and same methods used in Example 1 except 3 p.p.h. of a leafy mica was used in place of the silica.

EXAMPLE 3

A wiper was prepared using the same conditions as set out in Example 1 using 100 parts of a silicone elastomer, 10 parts mica, 1 part molybdenum disulfide, and 1.5 parts of a peroxide catalyst.

EXAMPLE 4

A wiper was prepared as per Example 3, except 20 parts of tetra fluoro ethylene powder was used in place of the mica and molybdenum disulfide.

All of the above wipers gave results similar to the results set out in Example 1.

EXAMPLE 5

One hundred parts of a room temperature vulcanizing silicone elastomer fluid was mixed with 10 p.p.h. of a silica powder, 10 p.p.h. of a solution containing 5% dicoco dimethyl ammoniumchloride, 2.5% coco polyoxy ethylene (2) amine, 2.0% silicone oil and 90.5% Freon solvent, and 1.5 p.p.h. of 2 - 4 dichlorobenzoylperoxide catalyst. The mixture was poured into a mold and cured at room temperature for 24 hours. This wiper had excellent repellent characteristics. A similar wiper with 20 p.p.h. of silica was unsatisfactory.

EXAMPLE 6

A wiper blade prepared as in Example 5, was made of 100 parts of a room temperature vulcanizing silicone elastomer fluid, 10 p.p.h. of silica, 2 p.p.h. of 2 - 4 dichlorobenzoylperoxide catalyst and 10 p.p.h. of a solution of about 2 weight percent of an acid neutralized cationic copolymer as set out above; about 84 weight percent water and about 14 weight percent isopropanol. This blade imparted hydrophobic characteristics to a windshield and gave visibility even in a heavy downpour.

EXAMPLE 7

A standard windshield wiper of natural rubber chloronated along the line of contact with the windshield was removed from an automobile and immersed in a solution of about 50 weight percent of an acid neutralized cationic copolymer as set out above; and about 50 weight percent isopropanol. The blade was immersed for a week, removed from the solution, rinsed in alcohol and placed back on the windshield of an automobile for test. The treated blade imparted hydrophobic properties to the windshield for several weeks in heavy rain before the hydrophobic properties disappeared.

EXAMPLE 8

A foamed open cell organic elastomer was impregnated with the fluid as set out in Example 7, bonded to the edge of a standard windshield wiper then installed on an automobile for test. The copolymer was leached out of the foamed elastomer by rain to impart hydrophobic properties to the windshield, but the rate at which the copolymer was removed was greater than desired.

We claim:

1. A windshield wiper blade capable of imparting hydrophobic characteristics to a windshield against which it operates comprising: a dimethylsiloxane and a siloxane containing a functional group with said siloxane selected from a group consisting essentially of vinylmethylsiloxane, phenylmethylsiloxane, and trifluoropropylmethylsiloxane as an elastomeric copolymer; a filler selected from the group consisting essentially of silica, mica, molybdenum disulfide, and tetra fluoro ethylene dispersed throughout the copolymer in amounts of about 3 to 20 parts per hundred based on the copolymer; and about .2 to 10 parts per hundred of an additive dispersed through the copolymer, said additive selected from the group of materials consisting essentially of dicoco dimethyl ammonium chloride, and an acetate salt of a copolymer of the formula

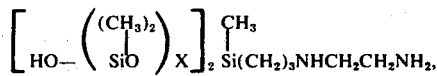

and X has a total value of from 10 to 400 inclusive.

2. A windshield wiper as in claim 1 wherein the additive is dicoco dimethyl ammonium chloride.

3. A windshield wiper as in claim 1 wherein the additive is an acetic acid neutralized copolymer of the formula

and X has a total value of from about 10 to 40 inclusive.

4. A windshield wiper blade capable of imparting hydrophobic characteristics to a windshield against which it operates comprising: a silicone elastomeric copolymer consisting of dimethylsiloxane and about 0.142 part per hundred based on the dimethylsiloxane one of a siloxane selected from the group consisting essentially of vinylmethylsiloxane, phenylmethylsiloxane, and trifluoropropylmethylsiloxane; said copolymer containing about 3 to 20 parts per hundred, based on the copolymer, of a filler dispersed throughout the copolymer, said filler selected from the group consisting essentially of silica, mica, molybdenum disulfide, and tetra fluoro ethylene; and a dispersed additive in amounts of about 0.2 to 10 parts per hundred of the copolymer, said additive selected from the group of materials consisting essentially of dicoco dimethyl ammonium chloride and an acetate salt of a copolymer of the formula

and
X has a total value of from 10 to 400 inclusive.

5. A windshield wiper as in claim 4 wherein the additive is dicoco dimethyl ammonium chloride.

6. A windshield wiper as in claim 4 wherein the additive is an acetic acid neutralized copolymer of the formula

and X has a total value of from about 10 to 40 inclusive.

7. A windshield wiper blade capable of imparting hydrophobic characteristics to a windshield against which it operates comprising: about 100 parts of dimethylsiloxane polymer and about 0.142 parts of a siloxane selected from the group of siloxanes consisting essentially of vinylmethylsiloxane, phenylmethylsiloxane, and trifluoropropylmethylsiloxane to make up an elastomeric copolymer, about 3 to 20 parts per hundred of a dispersed filler selected from the group of materials consisting essentially of silica, mica, molybdenum disulfide, and tetra fluoro ethylene, and about 0.2 to 10 parts per hundred of an additive selected from the group of materials consisting essentially of dicoco dimethyl ammonium chloride, and an acetate salt of a copolymer of the formula

and X has a total value of from 10 to 400 inclusive.

* * * * *